(12) United States Patent
Lampe-Jürgens et al.

(10) Patent No.: US 12,455,180 B2
(45) Date of Patent: Oct. 28, 2025

(54) SYSTEM AND METHOD FOR SWITCHED MEASURING OF FLOW TUBES OF A FLOW METER

(71) Applicant: Honeywell International Inc., Morris Plains, NJ (US)

(72) Inventors: Christian Lampe-Jürgens, Spelle (DE); Ralf Heinrich Schröder genannt Berghegger, Glandorf (DE); Tobias Meimberg, Osnabrück (DE); Andreas Wuchrer, Georgsmarienhütte (DE); Juri Singer, Alfhausen (DE)

(73) Assignee: Honeywell International Inc., Charlotte, NC (US)

( * ) Notice: Subject to any disclaimer, the term of this patent is extended or adjusted under 35 U.S.C. 154(b) by 406 days.

(21) Appl. No.: 18/073,707

(22) Filed: Dec. 2, 2022

(65) Prior Publication Data

US 2024/0183697 A1    Jun. 6, 2024

(51) Int. Cl.
*G01F 1/66*    (2022.01)

(52) U.S. Cl.
CPC ................................. *G01F 1/662* (2013.01)

(58) Field of Classification Search
None
See application file for complete search history.

(56) References Cited

U.S. PATENT DOCUMENTS

| | | |
|---|---|---|
| 4,313,465 A | 2/1982 | Holzem et al. |
| 5,123,288 A | 6/1992 | Tench et al. |
| 5,861,556 A | 1/1999 | Nukui et al. |
| 8,881,601 B2 | 11/2014 | Lammerink et al. |
| 10,928,414 B2 | 2/2021 | Hies et al. |
| 11,099,043 B2 | 8/2021 | Maginnis et al. |

(Continued)

FOREIGN PATENT DOCUMENTS

| | | | | |
|---|---|---|---|---|
| EP | 0566708 B1 | * | 4/1997 | ............ G01F 1/668 |
| EP | 0681684 B1 | * | 4/1997 | ............ G01F 1/662 |

(Continued)

OTHER PUBLICATIONS

"Single Tube Flow Meters," www.aalborg.com.

(Continued)

*Primary Examiner* — Peter J Macchiarolo
*Assistant Examiner* — Jermaine L Jenkins
(74) *Attorney, Agent, or Firm* — KPPB Law; Luis M. Ortiz; Kermit D. Lopez

(57) ABSTRACT

A method and system for determining a time-of-flight in an integrated flow meter, can include a housing including an inlet port and an outlet port, and a group of flow tubes connected in parallel to each other. Each flow tube among the group of flow tubes can include two or more transducers that can measure upstream and downstream time-of-flight. Each flow tube can further include one or more outlets connected to the outlet port of the housing via an outlet channel. A controller can be connected electronically to the transducers, wherein the controller is operable to measure the time-of-flight in a flow tube for a predetermined time using the transducers, toggle between the transducers of each flow tube to measure the remaining flow tubes within a predetermined time and determine the overall flow rate of the group of flow tubes in the integrated flow meter.

20 Claims, 7 Drawing Sheets

(56) References Cited

U.S. PATENT DOCUMENTS

| | | | |
|---|---|---|---|
| 11,391,609 B2 * | 7/2022 | Cawte | G01F 25/10 |
| 2021/0190568 A1 | 6/2021 | Haag et al. | |
| 2022/0136879 A1 | 5/2022 | Meimberg et al. | |

FOREIGN PATENT DOCUMENTS

| | | | | |
|---|---|---|---|---|
| EP | 1812774 B1 * | 10/2015 | | G01F 1/662 |
| EP | 3832265 A1 * | 6/2021 | | G01F 1/662 |

OTHER PUBLICATIONS

"Model Px multi flow tube meters," Aalborg.
"Time of Flight," Retrieved from "https://en.wikipedia.org/w/index.php?title=Time_of_flight&oldid=1119083002", page last edited on Oct. 30, 2022.

* cited by examiner

SYSTEM AND METHOD FOR SWITCHED MEASURING OF FLOW TUBES OF A FLOW METER

TECHNICAL FIELD

Embodiments relate to the switched measuring of one or more flow sensors within a flow meter. More specifically, embodiments relate to systems, devices and methods for switched measuring of one or more flow tubes using one measurement microcontroller in a flow meter.

BACKGROUND

Many heating and air conditioning systems sense air flow for energy monitoring and/or may also measure natural gas flow. In addition, numerous and varied manufacturing processes can sense the flow rate of various fluids utilized in these processes. Systems that include flow meters can detect and measure the flow rate of a fluid with on/off valves that are connected in parallel. For example, an averaging pitot probe that involves the use of two tubes of circular cross-section can be disposed side-by-side and mounted in a gas-tight manner in the wall of a pipe to measure the speed of gas flow through the pipe.

Systems have also been implemented, which employ a sensor module and one or more bypass modules, and which may require proportional flow characteristics. The flow rate ratio between the each of modules is differential pressure dependent. Therefore, due to a differential pressure change from one module to another, the total flow rate will be calculated incorrectly. Alternatively, systems have been implemented that include several sensor modules in parallel, but this arrangement can raise costs and also the Ex-protection (Explosion-Protection) design can be difficult to implement, and critical components (e.g., condensers) may be used multiple times.

In conventional designs, meter sizes may be scaled by measuring multiple flow tubes and measuring the flow rate with multiple flow tubes. However, the use of a single controller responsible for controlling multiple flow tubes has not been implemented in such conventional implementations. In scaling a flow meter, a difficult effort is required because many tests may be required to accomplish so many simulations such as, for example, flow simulations for the ultrasonic gas meter or an multiple ultrasonic flow tube.

It is evident that the development of an ultrasonic flow meter represents a great deal of effort, which requires several optimizations of used components, flow tube dimensions and testing with different flows, temperatures and gases. It is very difficult to scale a flow meter to larger meter sizes and consequently, the effort to develop a specific flow tube for each meter size remains a tremendous challenge.

Currently, there are no systems or methods that can accurately calculate the flow rate in multiple flow tubes by one controller. This is a requirement for a cost-effective system and method for the accurate measurement of the flow rate in multiple flow tubes.

SUMMARY

The following summary is provided to facilitate an understanding of some of the features of the embodiments and is not intended to be a full description. A full appreciation of the various aspects of the embodiments disclosed herein can be gained by taking the specification, claims, drawings, and abstract as a whole.

It is, therefore, one aspect of the embodiments to provide for improved methods, systems and devices for switched measuring of one or more flow sensors within a flow meter.

It is another aspect of the embodiments to provide for systems, devices and methods for switched measuring of one or more flow tubes using one measurement microcontroller in a flow meter.

It is also an aspect of the disclosed embodiments to provide for methods, systems, and devices that can determine the flow rate in an integrated flow meter.

The aforementioned aspects and other objectives can now be achieved as described herein. In an embodiment, a system for determining the flow rate in an integrated flow meter, can include: a housing comprising an inlet port and an outlet port, and a plurality of flow tubes connected in parallel to each other, wherein each flow tube among the plurality of flow tubes includes at least two transducers that measure upstream and downstream time-of-flight. Each flow tube can further include at least one outlet connected to the outlet port of the housing via an outlet channel. In addition, the at least one inlet of each flow tube can be connected to the inlet port of the housing via an inlet channel. A controller can be connected to the at least two transducers of each flow tube. The controller is operable to measure the time-of-flight (absolute time-of-flight and delta time-of-flight), calculate a flow rate from the time-of-flight measurements in a flow tube among the plurality of flow tubes for a predetermined time using the at least two transducers, toggle between the at least two transducers of each flow tube to measure the remaining flow tubes among the plurality of flow tubes within the predetermined time, and determine the overall flow rate of the plurality of flow tubes in the integrated flow meter.

In another embodiment, a method can be implemented for determining a flow rate of an integrated flow meter. The integrated flow meter can include a housing having an inlet port and an outlet port, and a plurality of flow tubes connected in parallel to each other, wherein each of the flow tube includes at least two transducers to measure upstream and downstream time-of-flight, wherein each of the flow tube includes at least one outlet connected to the outlet port of the housing via an outlet channel, at least one inlet of each flow tube connected to the inlet port of the housing via an inlet channel. A controller can be connected to each of the transducers of the flow tube. The aforementioned method of determining the flow rate, can involve: measuring the time-of-flight and calculate the flow rate in a flow tube among the plurality of flow tubes for a predetermined time using the at least two transducer, toggling between the transducer of each of the flow tube to measure the remaining flow tubes of the plurality of flow tubes within the predetermined time, and determining an overall flow rate of the plurality of flow tubes in the integrated flow meter.

In yet another embodiment, a system for determining a flow rate in an integrated flow meter, can include at least one processor, and a non-transitory computer-usable medium embodying computer program code, the computer-usable medium operable to communicate with the at least one processor. The computer program code can include instructions executable by the at least one processor and operable for: measuring the time-of-flight and calculate the flow rate in a flow tube among a plurality of flow tubes for a predetermined time using at least two transducer of the plurality of flow tubes, toggling between the transducer of each of the flow tube to measure the remaining flow tubes of the plurality of flow tubes within the predetermined time, and determining an overall flow rate of the plurality of flow tubes in the integrated flow meter.

In still another embodiment, an integrated flow meter can include at least one processor and a non-transitory computer-usable medium embodying computer program code, the computer-usable medium operable to communicate with the at least one processor. The computer program code can comprise instructions executable by the at least one processor and operable for: measuring the time-of-flight in a flow tube among a plurality of flow tubes for a predetermined time using at least two transducer of the plurality of flow tubes; toggling between the transducer of each of the flow tube to measure the remaining flow tubes of the plurality of flow tubes within the predetermined time; and determining an overall flow rate of the plurality of flow tubes in the integrated flow meter.

These and other features, aspects, and advantages are further explained by the following detailed description, drawing and appended claims.

BRIEF DESCRIPTION OF THE DRAWING

The accompanying FIGS., in which like reference numerals refer to identical or functionally similar elements throughout the separate views and which are incorporated in and form a part of the specification, further illustrate the embodiments and, together with the detailed description, serve to explain the principles of the embodiments.

Identical or similar parts or elements in the figures may be indicated by the same reference numerals.

DETAILED DESCRIPTION

Figure 1:
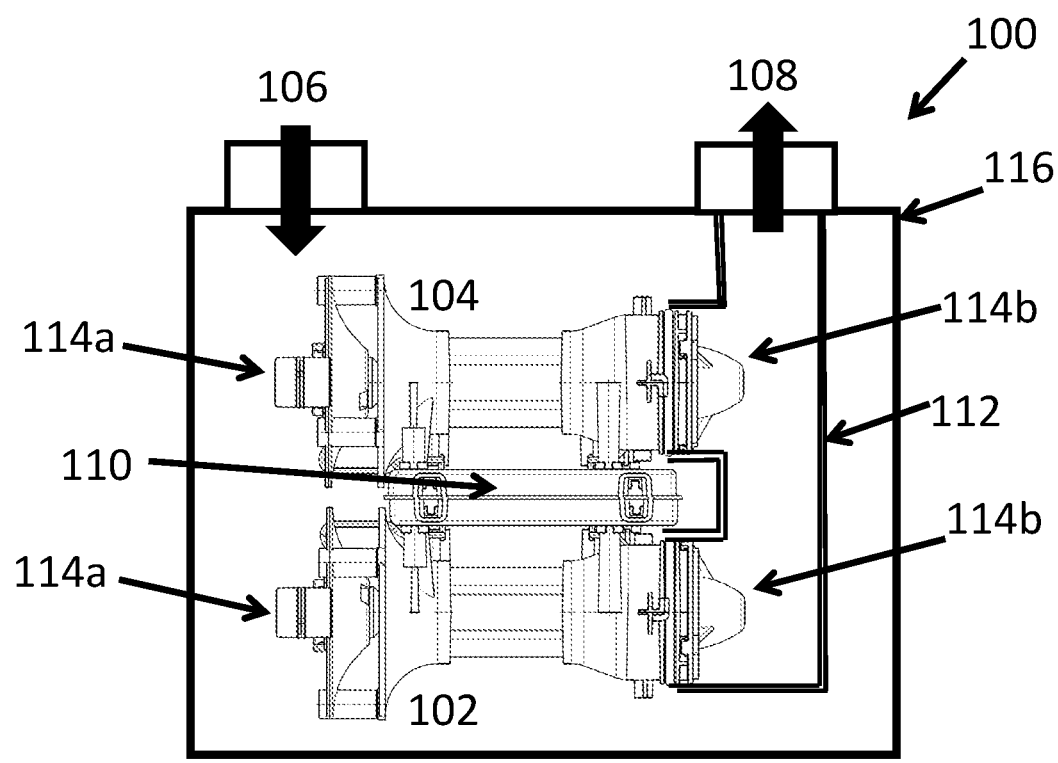
FIG. 1 illustrates a schematic diagram of a flow meter without a valve, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. Furthermore, the term "at least one" as used herein, may refer to "one or more." For example, "at least one widget" may refer to "one or more widgets."

In addition, the term "based on" may be understood as not necessarily intended to convey an exclusive set of factors and may, instead, allow for existence of additional factors not necessarily expressly described, again, depending at least in part on context.

Furthermore, it is advantageous to set forth other definitions of certain words and phrases used throughout this patent document. The terms "application" and "program" can refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, can encompass both direct and indirect communication. The terms "include" and "comprise," as well as derivatives thereof, can mean inclusion without limitation. The term "or" may be inclusive, meaning "and/or".

The term time-of-flight (ToF) as utilized herein can relate to a measurement of the time taken by an object, particle or wave (e.g., acoustic, electromagnetic, etc.) to travel a distance through a medium This information can then be used to measure velocity or path length, or as a way to learn about the particle or medium's properties (such as composition or flow rate).

FIG. 1 through FIG. 6, discussed below, and the description of the various embodiments are used to describe the principles of the embodiments and are provided by way of illustration only and should not be construed in any way to limit the scope of the embodiments. Those skilled in the art will understand that the embodiments may be implemented in any type of suitably arranged device or system.

FIG. 1 illustrates a schematic diagram of a flow meter 100 that can include a housing 116, a plurality of flow tubes 102, 104, and a metrology printed circuit board (MCA PCBA) 110. The housing 116 can include an inlet port 106 and an outlet port 108 of the flow meter 100. The flow meter 100 can further include the plurality of flow tubes 102, 104, which can be connected in parallel to each other. Each of the flow tubes 102, 104 can include two or more transducers 114a, 114b that can measure upstream and downstream the time-of-flight, which is relation to the flow. To measure the flow, each of the flow tubes 102, 104 can include at least one inlet and at least one outlet connected respectively to the inlet port 106 and the outlet port 108 of the housing 116. In some embodiments, the outlet of the flow tube may be connected to the outlet port 108 via an outlet channel 112. In other embodiments, the inlet of the flow tubes 102, 104 may be connected to the inlet port 106 via an inlet channel (not shown).

In FIG. 1, the flow meter 100 can include the aforementioned MCA PCBA 110, which can be placed between the plurality of the flow tubes 102, 104. In some embodiments, the MCA PCBA 110 can be placed in the middle of both of the flow tubes 102, 104, so that the distance from the MCA PCBA 110 to each of the transducers 114a, 114b of each of the flow tubes 102, 104 is same. In addition, the MCA PCBA 110 may include a controller or a processing device, which can be connected wired or wirelessly to each of the transducers 114a, 114b of each of the flow tubes 102, 104. The controller measures the time-of-flight and calculates a flow rate in the plurality of the flow tubes for a predetermined time using the two transducers 114a, 114b. The controller can further toggle the measurement between the transducers of each flow tube to measure the flow rate of remaining flow tubes among the plurality of flow tubes within the predetermined time. Furthermore, the controller can determine the flow rate of the plurality of flow tubes in the flow meter. In an example with two flow tubes, each flow tube of the flow meter with a size of G6 (10 m$^3$/h) the flow meter may be able to measure 20 m$^3$/h within a pressure loss of 2 mbar.

Figure 2:
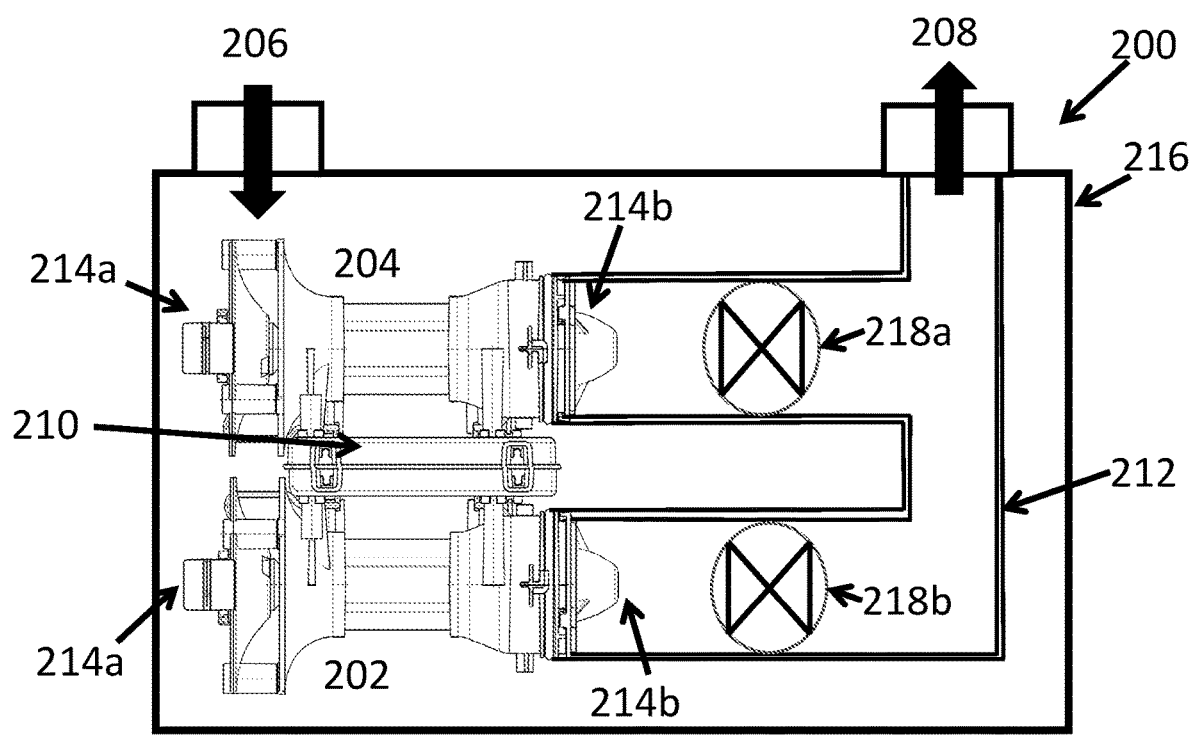
FIG. 2 illustrates schematic diagram of a flow meter with a plurality of valves, in accordance with an embodiment.

FIG. 2 illustrates a schematic diagram of a flow meter 200 that can include a housing 216, a plurality of flow tubes 202, 204, and a metrology printed circuit board (MCA PCBA) 210. The housing 216 can include an inlet port 206 and an outlet port 208 of the flow meter 200. Each of the flow tubes 202, 204 can include two or more transducers 214a, 214b that can measure upstream and downstream time-of-flight, which is in relation to the flow. To measure the flow, each of the flow tubes 202, 204 can include at least one inlet and outlet connected respectively to the inlet port 206 and the outlet port 208 of the housing 216. The outlet of the flow tube 200 may be connected to the outlet port 208 via an outlet channel 212. The inlet of the flow tube may be coupled to the inlet port 206 via an inlet channel (not shown).

In the embodiment shown in FIG. 2, the flow meter 200 can include a plurality of valves 218a, 218b associated to the flow tubes 202, 204 to control the flow of the flow meter 200 in each of the flow tubes 202, 204. The outlet of each flow tubes 202, 204 can be connected to at least one valve from the plurality of valves 218a, 218b. Each of the valves 218a, 218b can be connected to the outlet port 208 via the outlet channel 212. In the embodiment shown in FIG. 2, the MCA PCBA 210 may include a controller or a processing device (not shown in FIG. 2) which can be connected wired or wirelessly to at least one valve driver associated to each of the valve 218a, 218b of the each flow tube. The aforementioned controller for processing device may drive each of the valves 218a, 218b using the valve driver. The controller or processing device may selectively drive each of the valves 218a, 218b for a short open and close time to operate at least one flow tube from among the plurality of flow tubes 202, 204 with a higher current than that which may be required by the flow tube(s). Alternatively, the controller may selectively drive each of the valves 218a, 218b for longer open and close periods to operate at least one flow tube from among the plurality of flow tubes 202, 204 with less current than that which may be required by the flow tube(s). With the help of the embodiments, the design of the flow meter 200 also results in the provision of easier Ex-Protection.

Figure 3:
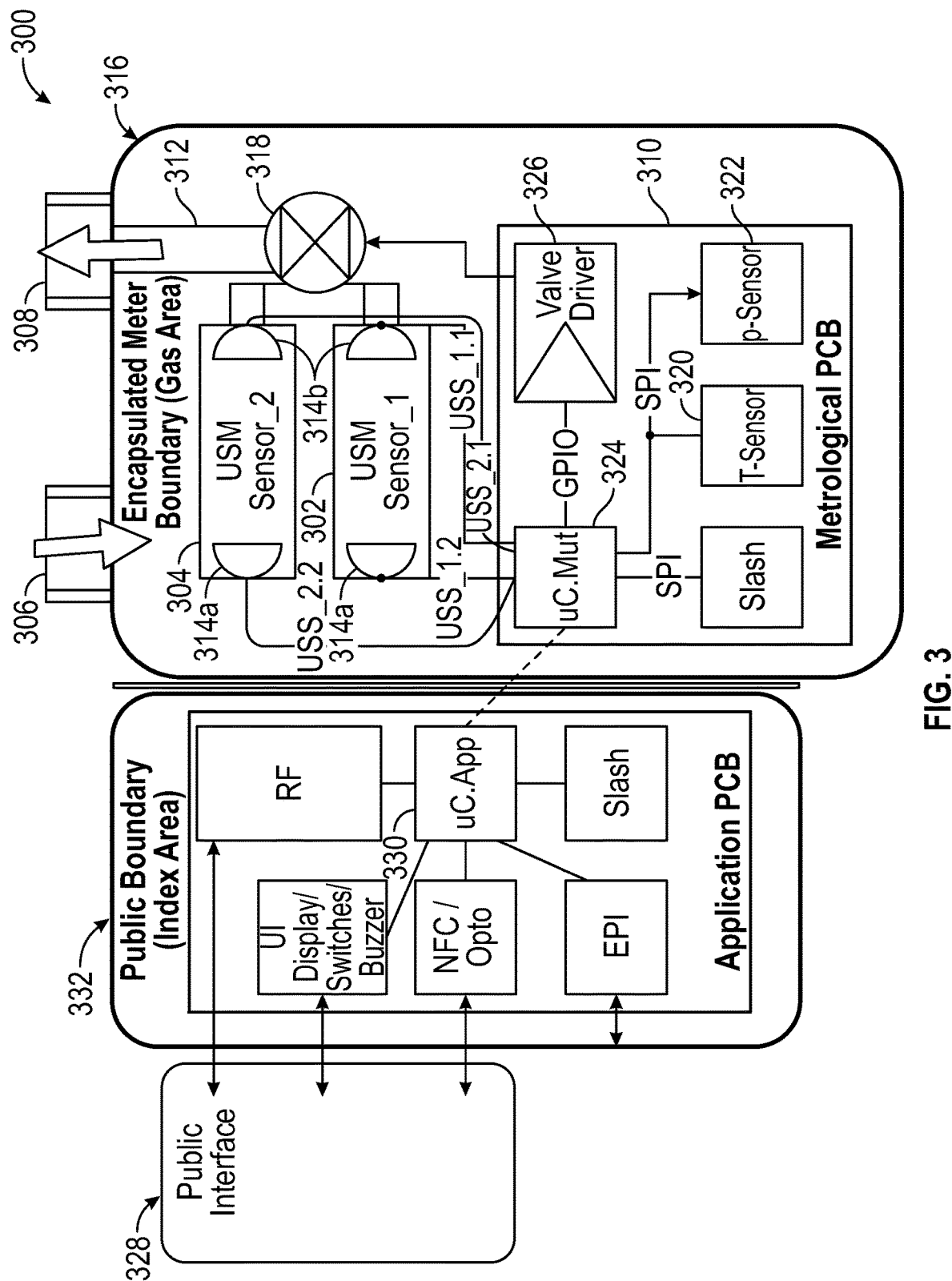
FIG. 3 illustrates a block diagram depicting the flow meter architecture of a smart gas meter with one valve, in accordance an embodiment.

FIG. 3 illustrates an example system which is a flow meter 300 includes a housing 316, a plurality of flow tubes 302, 204, and a metrology printed circuit board (MCA PCBA) 310. The plurality of flow tubes 302, 204 may be an ultrasonic sensor (USM). The housing 316 includes an inlet port 306 and an outlet port 308 of the flow meter 300. Each of the flow tubes 302, 204 includes at least two transducers 314a, 314b that measure upstream and downstream time-of-flight, which is in relation to the flow. To measure the flow, each flow tubes 302, 204 includes at least one inlet and outlet connected to the inlet port 306 and the outlet port 308 of the housing 316. The outlet of the plurality of flow tubes 302, 204 may be connected to the outlet port 208 via an outlet channel 312. The inlet of the plurality of flow tubes 302, 204 may be connected to the inlet port 306 via an inlet channel (not shown).

In the current embodiment of FIG. 3, Each of the outlet of the plurality of flow tubes 302, 204 may be coupled together to an outlet conduit 312a which is controlled by at least one valve 318. The at least one valve 318 is directly connected to the outlet port 308 via the outlet channel 312. The outlet channel 312 and the outlet conduit 312a are connected together and being controlled via the at least one valve 318.

In the current embodiment of FIG. 3, the MCA PCBA 310 may include a valve driver 326, one or more temperature sensors 320, one or more pressure sensors 322 and a controller 324. The controller 324 operable to control the valve driver 326 to drive the at least one valve 318. The controller 324 is further operable to control the one or more temperature sensors 320 and the one or more pressure sensors 322. Further, the controller 324 is further operable to control each of the transducers 314a, 314b of the plurality of flow tubes 302, 304.

In the current embodiment of FIG. 3, the controller 324 operable to connect to an index area 332 associated to the flow meter 300. The index area 332 includes a processing application 330 associated to the controller 324. The processing application 330 may be connected wired or wirelessly to the controller 324 of the flow meter 300 using a link of communication including at least one of Long-Term Evolution (LTE) communication, multiple protocol communication such as Advocates of Linux Open-source Hawaii Association (ALOHA), Radio Frequency (RF) Communication, Near-field communication (NFC) or Optical communication. The processing application 330 operable to control or instruct the controller to perform the operation of the flow meter 300. The processing application 330 operable to connect with a user interface, switches, alarm or buzzer included in the index area 332. The processing application may be further operable to connect with a public interface or a graphical user interface 328 using, for example, LTE communications, ALOHA communications, RF communications, NFC, or optical communications, etc. The index area 332 can provide at least one of volume readings, flow rate readings, and a status of the MCA PCBA 310 so as to provide an indication of any alarms or alerts with respect to the flow meter 300.

In the current embodiment of FIG. 3, the controller 324 operable to control each of two transducers 314a, 314b of each of the flow tubes 302, 204. The transducer 314a of each of the flow tubes 302, 204 sends an ultrasonic signal with the flow to the other transducer 314b of each of the flow tubes 302, 204 to measure a downstream time. The other transducer 314b of each of the flow tubes 302, 204 sends back another ultrasonic signal against the flow to the transducer 314a of each of the flow tubes 302, 204 to measure an upstream time. The controller 324 operable to measure a flow rate or time measurement of the flow of each of the flow tubes 302, 204 for a predetermined time of 2 seconds. The flow rate provides a difference between the downstream time and the upstream time. The time difference between the downstream time and the upstream time relates to a flow rate of the flow meter 300. Note that the aforementioned 2 send time interval should not be considered a limiting feature of the embodiments but is provided merely as an example of an average value. Other time intervals may be utilized in different embodiments. A dynamic sampling period can be implemented to, for example, make tampering harder.

In the current embodiment of FIG. 3, the controller 324 operable to determine the upstream time and the downstream time of the flow in a first flow tube 302 for a predetermined time of, for example, 2 seconds to measure a first flow rate of the first flow tube 302. Similarly, the controller 324 operable to determine the upstream time and downstream time of the flow in a second flow tube 304 for another predetermined time of 2 seconds to measure a second flow rate of the second flow tube 304. The controller 324 operable to add the first flow rate and the second flow to determine an overall flow rate of the flow meter 300. The controller 324 operable to toggle the measurement between the two transducers 314a, 314b of each flow tubes 302, 204 to measure an overall flow rate of the first flow tube 302 and the second flow tube 304 for the first flow rate and the second flow rate within the predetermined time. The controller 324 operable to measure the first flow rate of the first flow tube 302 and then multiply the first flow rate with a number of flow tubes and a duration between two measurements of the first flow tube 302 and the second flow tube 304 to provide a total flow rate. To determine the overall flow rate, the controller operable to divide the total flow rate to a total duration of the measurement of the first flow tube 302 and the second flow tube 304.

Figure 4:
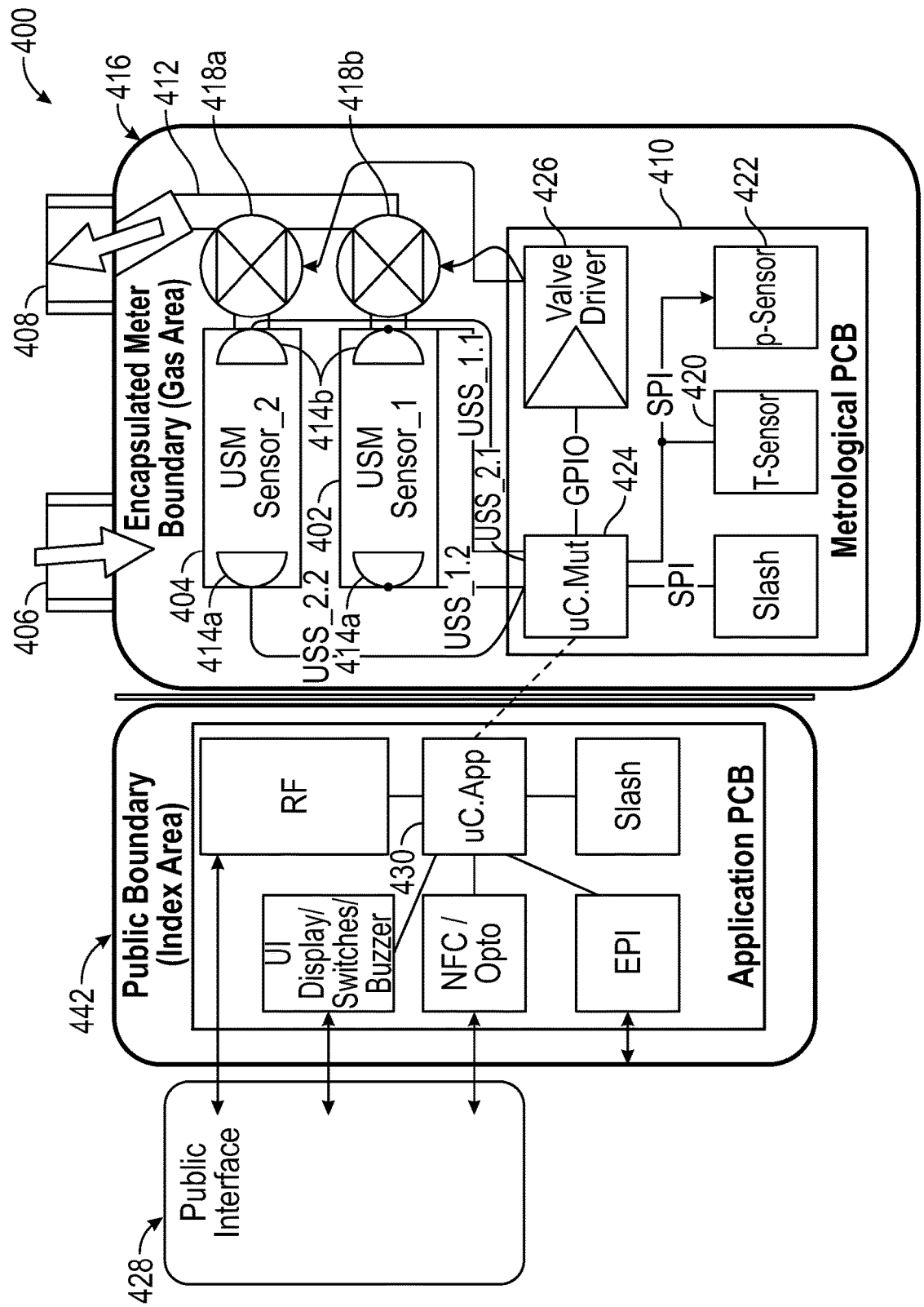
FIG. 4 illustrates a block diagram of the flow meter architecture of a smart gas meter with two valves, in accordance with an embodiment.

FIG. 4 illustrates a block diagram of a flow meter 400 similar to the flow meter 300 depicted in FIG. 3, albeit with some subtle but important differences. In the embodiment shown in FIG. 4, the flow meter 400 can include a housing 416, a plurality of flow tubes 402, 404, and a metrology printed circuit board (MCA PCBA) 410. The MCA PCBA 410 can include a valve driver 426, one or more temperature sensors 420, one or more pressure sensors 422 and a controller 424. To measure the flow, each flow tube 402, 404 can include one or more inlets and one or more outlets connected to the inlet port 406 and the outlet port 408 of the housing 416. The outlet of the plurality of flow tubes 402, 404 may be connected to the outlet port 408 via an outlet channel 412. The inlet of the plurality of flow tubes 402, 404 may be connected to the inlet port 406 via an inlet channel (not shown). Each of the outlet of a first flow tube 402 and a second flow tube 404 among the plurality of flow tubes 402, 404 may be connected a first valve 418a and a second valve 418b, which can be connected to the outlet port 408 via the outlet channel 412. The first flow tube 402 with the first valve 418a and the second flow tube 404 with the second valve 418b are connected in parallel to each other.

In the current embodiment of FIG. 4, the controller 424 operable to determine upstream and downstream time-of-flight, which is in relation to the flow using each of the transducers 414b of the first flow tube 402 and the second flow tube 404 using an independent wave or pulse in each of the flow tubes 402, 404. The controller 424 using the valve driver 426 operable to control or toggle between the first valve 418a of the first flow tube 402 and the second valve 418b of the second flow tube 404 to measure a first flow rate and a second flow rate for a predetermine time. Separate measurement of the first flow rate in the first flow tube 402 using the first valve 418a and the second flow rate of the second flow tube 404 using the second valve 418b reduces the pressure loss to determine the overall flow rate of the plurality of flow tubes 402, 404 and improves the accuracy of the flow measurement in the flow meter 400.

In another embodiment similar to FIG. 4, the flow meter can be required for a meter class of G40, which has flow rate of 40 cubic meters per hour and a higher flow rate. The number of the plurality of flow tubes may be four or more in this example flow meter class. Each of four flow tubes may be connected to separate four valves respectively to measure the flow rate in each of the flow tubes. In an example, a flow meter, which may include four flow tubes, and a requirement to measure the flow rate at 10 cubic meter per hour, may permit three of the valves to close and only one valve to open to measure the flow rate at 10 cubic meter per hour. The embodiments may provide more flexibility to measure a required flow rate from 10 cubic to 40 cubic meter per hour by closing and opening any number of valve from four valves to provide a hyper meter range of the flow meter.

Figure 5:
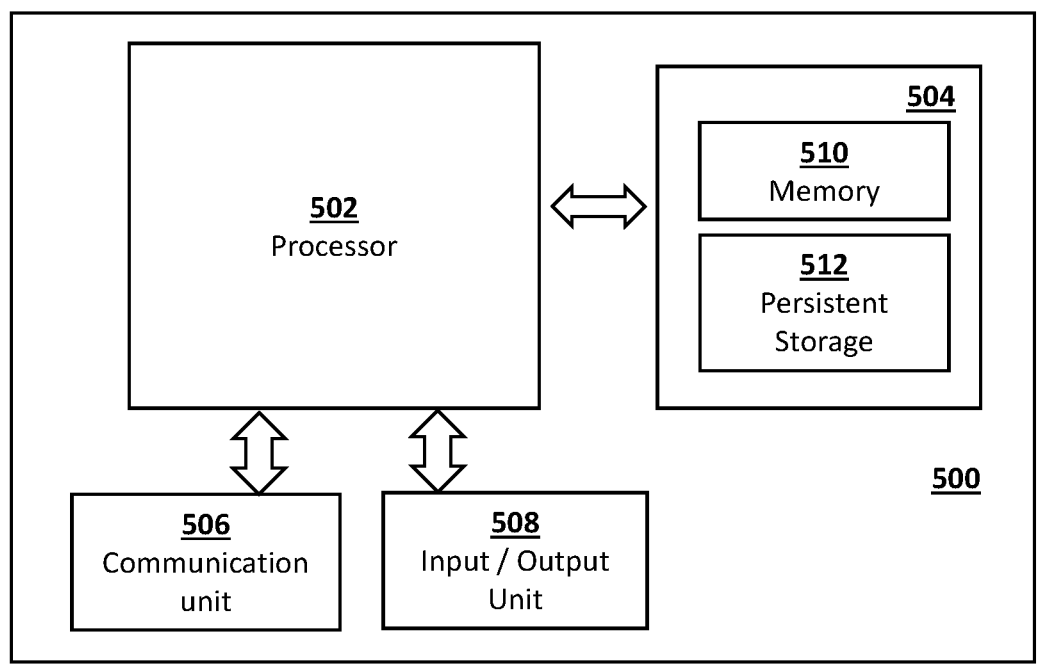
FIG. 5 illustrates a block diagram of a computing device that can support a flow meter, in accordance with an embodiment.

FIG. 5 illustrates an example device 500 may be, for example, a metrology printed circuit board (MCA PCBA) for a flow meter in accordance with this disclosure. The device 500 includes at least one processor 502, at least one storage device 504, at least one communications unit 506, and at least one input/output ("I/O") unit 508. Each processor 502 can execute instructions may be loaded into a memory 510. Each processor 502 denotes any suitable processing device, including one or more microprocessors, microcontrollers, digital signal processors, application specific integrated circuits ("ASICs"), field programmable gate arrays ("FPGAs"), or discrete circuitry.

The memory 510 and persistent storage 512 are examples of storage devices 504, which can represent any structure(s) that can store and facilitate retrieval of information including data, program code, and/or other suitable information on a temporary or permanent basis. The memory 510 may represent a random-access memory or any other suitable volatile or non-volatile storage device(s). The persistent storage 512 may contain one or more components or devices supporting longer-term storage of data including a read only memory, hard drive, flash memory, or optical disc.

The communications unit 506 supports communications with other systems or devices. For example, the communications unit 506 could include at least one network interface card or wireless transceiver facilitating communications over at least one wired or wireless network. The communications unit 506 may support communications through any suitable physical or wireless communication link(s).

The I/O unit 508 allows for input and output of data. For example, the I/O unit 508 may provide a connection for user input through a keyboard, mouse, keypad, touchscreen, or other suitable input device. The I/O unit 508 may also send output to a display, printer, or other suitable output device.

Although FIG. 5 illustrates one example of the device 500 such as the MCA PCBA supporting the flow meter to prevent pressure loss during measurement the overall flow rate of a plurality of flow tubes and improves the accuracy of the flow measurement in the flow meter. For example, components could be added, omitted, combined, further subdivided, or placed in any other suitable configuration according to particular needs. Also, computing devices can come in a wide variety of configurations, and FIG. 3 does not limit this disclosure to any particular configuration of computing device.

Figure 6:
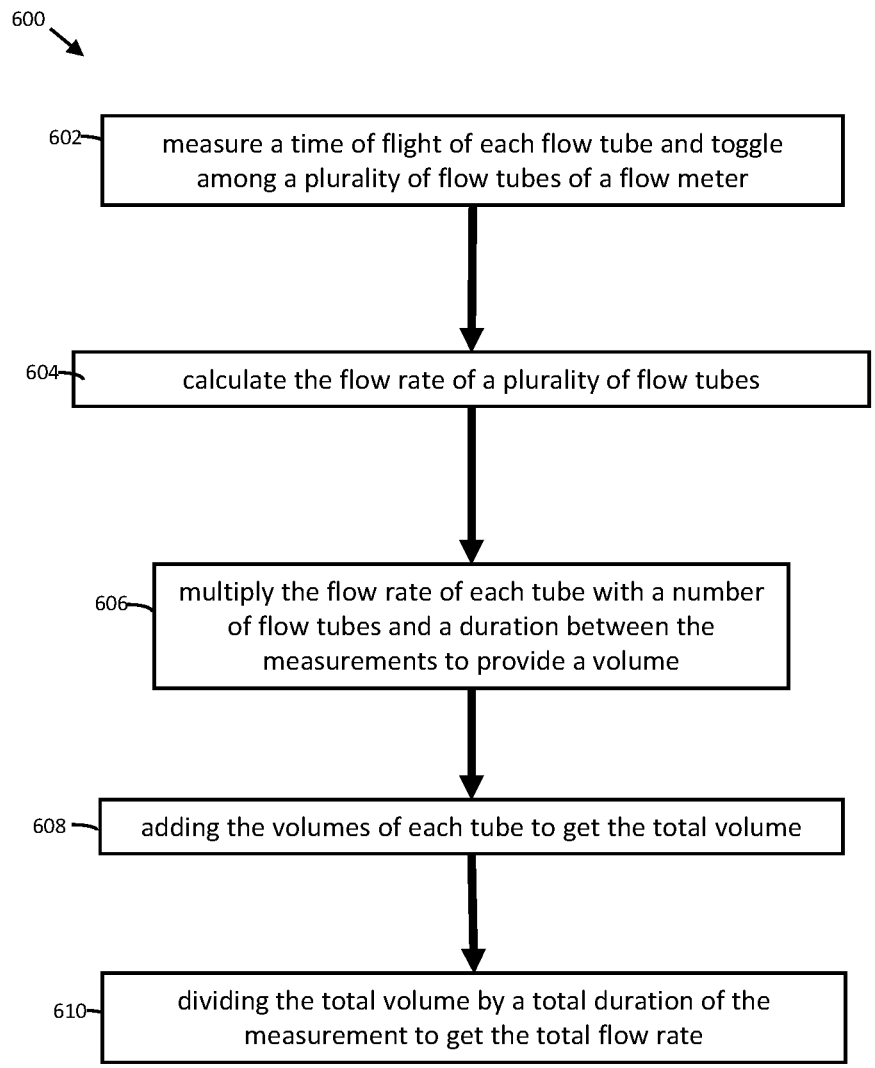
FIG. 6 illustrates a high-level flow chart of operations depicting logical operational steps of a method for switched measuring of flow tubes of a flow meter, in accordance with an embodiment.

FIG. 6 illustrates a high-level flow chart of operations depicting logical operational steps of a method 600 for switched measuring of flow tubes of a flow meter, in accordance with an embodiment. As shown at block 602, a step or operation can be implemented for measure a time-of-flight of each flow tube and toggle among a plurality of flow tubes of a flow meter. Next, as depicted at block 604, a step or operation can be implemented for calculating the flow rate of a plurality of flow tubes. Thereafter as illustrated at block 606, a step or operation can be implemented for multiply the flow rate of each tube with a number of flow tubes and a duration between the measurements to provide a volume. As shown next at block 608, a step or operation can be implemented to adding the volumes of each tube to get the total volume. As shown next at block 610, a step or operation can be implemented to divide the total volume by a total duration of the measurement to get the total flow rate.

Figure 7:
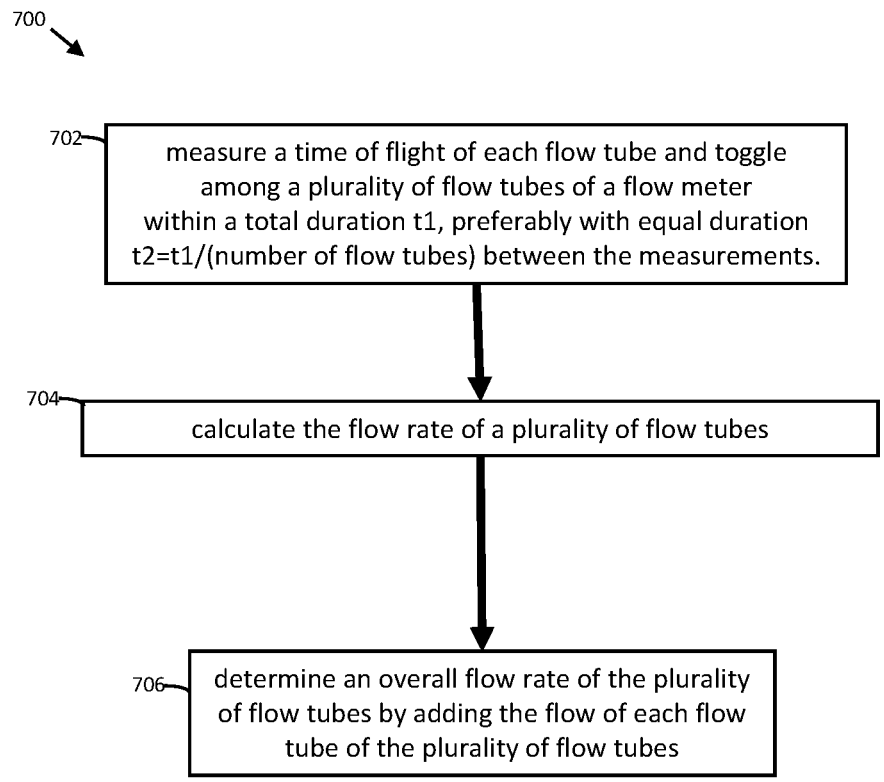
FIG. 7 illustrates a high-level flow chart of operations depicting logical operational steps of a method for switched measuring of flow tubes of a flow meter, in accordance with an embodiment.

FIG. 7 illustrates a high-level flow chart of operations depicting logical operational steps of a method 700 for switched measuring of flow tubes of a flow meter, in accordance with an embodiment. As shown at block 702, a step or operation can be implemented to measure a time-of-flight of each flow tube and toggle among a plurality of flow tubes of a flow meter within a total duration t1, preferably with equal duration t2-t1/(number of flow tubes) between the measurements. Next, as depicted at block 704, a step or operation can be implemented for calculating the flow rate of a plurality of flow tubes based on the measurement of the time-of-flight of each flow tube and the toggle among the plurality of flow tubes. Thereafter, as illustrated at block 706, a step or operation can be implemented to determine an overall flow rate of the plurality of flow tubes by adding the flow of each flow tube of the plurality of flow tubes.

While the present disclosure has described certain embodiments and generally associated methods, alterations and permutations of these embodiments and methods will be apparent to those skilled in the art. Accordingly, the above description of example embodiments does not define or constrain the present disclosure. Other changes, substitutions, and alterations are also possible without departing from the spirit and scope of the present disclosure, as defined by the following claims.

What is claimed is:

1. A system to determine a time-of-flight in an integrated flow meter, comprising:
a housing comprising an inlet port and an outlet port;
a plurality of flow tubes connected in parallel to each other, wherein each flow tube among the plurality of flow tubes includes at least two transducers that measure upstream and downstream time-of-flight, wherein each flow tube further includes:
at least one outlet of each flow tube connected to the outlet port of the housing via an outlet channel; and
a controller connected to the at least two transducers of each flow tube, wherein the controller is operable to:
measure a time-of-flight in a flow tube among the plurality of flow tubes for a predetermined time using the at least two transducers,
toggle between the at least two transducers of each flow tube to measure the remaining flow tubes among the plurality of flow tubes within the predetermined time, and
determine an overall flow rate of the plurality of flow tubes in the integrated flow meter.

2. The system according to claim 1, wherein the controller is further operable to determine a mean value of the time-of-flight of the plurality of the flow tubes within the predetermined time.

3. The system according to claim 1, wherein the controller is operable to toggle between the at least two transducers with a switching interval=an average time value/amount of flow tubes in the integrated meter.

4. The system according to claim 1, wherein the controller is further operable to:
measure the time-of-flight of each flow tube among the plurality of flow tubes for the predetermined time,
multiply a number of flow tubes with the measured time-of-flight and a duration between each measurement to provide a total flow rate, and
determine the overall flow rate by dividing the total flow rate to a total duration of the measurement.

5. The system according to claim 1, wherein the controller is further operable to:
measure the time-of-flight of each flow tube among the plurality of flow tubes for the predetermined time, and
determine the overall flow rate of the plurality of the flow tubes by averaging the determined flow rate.

6. The system according to claim 5, wherein a valve driver is operable to simultaneously control a plurality of valves of the plurality of the flow tubes, and wherein the plurality of valves is connected to the outlet channel which is connected to the outlet port of the housing.

7. The system according to claim 6, wherein the controller is operable to:
drive each valve among the plurality of valves in parallel based on at least one of a short open or close time with a higher current, or
drive the each valve sequentially based on at least one of a longer open or close time with a reduced current.

8. The system according to claim 5, wherein a meteorological printed circuit board is located between the plurality of the flow tubes to provide an equal distance from the controller to each transducer of the plurality of the flow tubes.

9. The system according to claim 1 further comprising a meteorological printed circuit board that includes:
a plurality of sensors operable to sense at least one of: a temperature and a pressure of the plurality of flow tubes, and
a valve driver to control at least one valve among the plurality of the flow tubes, and
wherein the controller is further operable to determine a mean value of the time-of-flight of the plurality of flow tubes in the integrated flow meter.

10. The system according to claim 1, wherein the controller is operable to toggle between the at least two transducers using a switch connected between each of the at least two transducers and the controller.

11. A method to determine a time-of-flight of an integrated flow meter, the integrated flow meter including a housing having an inlet port and an outlet port, and a plurality of flow tubes connected in parallel to each other, wherein each of the flow tubes includes at least two transducers to measure upstream and downstream time-of-flight, wherein each of the flow tubes include at least one outlet connected to the outlet port of the housing via an outlet channel, and a controller connected to each of the transducers of the flow tube, the method, comprising:

measuring the time-of-flight in a flow tube among the plurality of flow tubes for a predetermined time using the at least two transducers, toggling between the transducer of each of the flow tubes to measure the remaining flow tubes of the plurality of flow tubes within the predetermined time, and determining an overall flow rate of the plurality of flow tubes in the integrated flow meter.

12. The method according to claim 11, wherein the step of determining further comprising determining a mean value of the time-of-flight of the plurality of the flow tubes within the predetermined time.

13. The method according to claim 11, wherein the step of toggling further comprising toggling between the transducers with a switching interval=an average time value I amount of flow tubes in the meter.

14. The method according to claim 11, further comprising:

measuring the time-of-flight of each flow tube among the plurality of flow tubes for the predetermined time, multiplying a number of flow tubes with the measured time-of-flight and a duration between each measurement to provide a total flow rate, and determining the overall flow rate by dividing the total flow rate to a total duration of the measurement.

15. The method according to claim 11, further comprising:

measuring the time-of-flight of each flow tube among the plurality of flow tubes for the predetermined time, and determining the overall flow rate of the plurality of the flow tubes by averaging the determined flow rate.

16. The method according to claim 11 further comprising:

sensing, by a plurality of sensors included in a meteorological printed circuit board of the integrated flow meter, at least one of temperature and pressure of the plurality of flow tubes, and controlling, by a valve driver, at least one valve of the plurality of the flow tubes, and determining, by the controller, a mean value of the time-of-flight of the plurality of flow tubes in the integrated flow meter.

17. The method according to claim 16, further comprising:

connecting a plurality of valves with the outlet channel which is connected to the outlet port of the housing, and simultaneously controlling, by the valve driver, the plurality of valves of the plurality of the flow tubes.

18. The method according to claim 17, further comprising:

driving each valve among the plurality of valves in parallel based on at least one of a short open or close time with a higher current, or driving each valve sequentially based on at least one of a longer open or close time with a reduced current.

19. The method according to claim 11, further comprising:

placing a meteorological printed circuit board between the plurality of flow tubes, and providing equal distance from the controller to the each of the transducers of the plurality of flow tubes.

20. An integrated flow meter, comprising:

at least one processor; and a non-transitory computer-usable medium embodying computer program code, the computer-usable medium operable to communicate with the at least one processor, the computer program code comprising instructions executable by the at least one processor and operable for:

measuring the time-of-flight in a flow tube among a plurality of flow tubes for a predetermined time using at least two transducers of the plurality of flow tubes;

toggling between the at least two transducers of each of the flow tubes to measure the remaining flow tubes of the plurality of flow tubes within the predetermined time; and determining an overall flow rate of the plurality of flow tubes in the integrated flow meter.

* * * * *